US008364394B2

(12) United States Patent
Taguchi (10) Patent No.: US 8,364,394 B2
(45) Date of Patent: Jan. 29, 2013

(54) TRAVEL TRACE GENERATION METHOD AND TRAVEL TRACE GENERATION DEVICE

(75) Inventor: Koji Taguchi, Isehara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 156 days.

(21) Appl. No.: 12/525,201

(22) PCT Filed: Oct. 30, 2008

(86) PCT No.: PCT/JP2008/069784
§ 371 (c)(1),
(2), (4) Date: Jul. 30, 2009

(87) PCT Pub. No.: WO2009/057705
PCT Pub. Date: May 7, 2009

(65) Prior Publication Data
US 2010/0204911 A1     Aug. 12, 2010

(30) Foreign Application Priority Data

Nov. 1, 2007   (JP) ................................. 2007-285412

(51) Int. Cl.
*G01C 21/00* (2006.01)
*G01C 21/34* (2006.01)
*G08G 1/123* (2006.01)

(52) U.S. Cl. ........ 701/410; 701/117; 701/411; 701/465; 701/302

(58) Field of Classification Search .......... 701/117–119, 701/200–204, 223, 23, 26, 400, 410, 411, 701/414, 423, 465, 302
See application file for complete search history.

(56) References Cited

U.S. PATENT DOCUMENTS 5,841,366 A * 11/1998 Yamamoto et al. ........... 340/901
(Continued)

FOREIGN PATENT DOCUMENTS

JP     A-7-192194     7/1995
JP     A-11-208306    8/1999
(Continued)

OTHER PUBLICATIONS

Fujioka et al., "Numerical Analysis of Minimum-Time Cornering," *Transactions of Society of Automotive Engineers of Japan*, vol. 24, No. 3, Jul. 1993, pp. 106-111 (with abstract).

(Continued)

*Primary Examiner* — Hussein Elchanti
*Assistant Examiner* — Rami Khatib
(74) *Attorney, Agent, or Firm* — Oliff & Berridge, PLC (57) ABSTRACT

A first convergent computation section 25 for deriving a running locus by a convergent computation such as to achieve a first constraint condition based on a target passing time $t_s$ and a road boundary of a road D and a running locus deriving section 26 for deriving a running locus by a convergent computation of an evaluation function J3 for preferring a predetermined driving condition in a state achieving the first constraint condition are provided, a running locus is convergently computed such as to satisfy the first constraint condition set according to the target passing time $t_s$ and the road boundary of the road D, and a running locus is derived by convergently computing an evaluation function J3 for preferring a predetermined driving condition in a state satisfying the first constraint condition.

6 Claims, 4 Drawing Sheets

U.S. PATENT DOCUMENTS

| | | | |
|---|---|---|---|
| 7,344,288 B2* | 3/2008 | Kobayashi et al. | 362/466 |
| 8,010,280 B2* | 8/2011 | Sekine | 701/445 |
| 2005/0055157 A1* | 3/2005 | Scholl | 701/207 |
| 2007/0156327 A1* | 7/2007 | Tipping et al. | 701/200 |
| 2010/0082238 A1* | 4/2010 | Nakamura et al. | 701/208 |

FOREIGN PATENT DOCUMENTS

| | | |
|---|---|---|
| JP | A-2000-346594 | 12/2000 |
| JP | A-2003-70102 | 3/2003 |
| JP | A-2003-99897 | 4/2003 |
| JP | A-2004-251786 | 9/2004 |
| JP | A-2004-326363 | 11/2004 |
| JP | A-2005-182186 | 7/2005 |
| JP | A-2005-228139 | 8/2005 |

OTHER PUBLICATIONS

Office Action issued in Japanese Patent Application No. 2007-285412 on Feb. 3, 2009 by the Japanese Patent Office. (with English-language Translation).

* cited by examiner

TRAVEL TRACE GENERATION METHOD AND TRAVEL TRACE GENERATION DEVICE

TECHNICAL FIELD

The present invention relates to a running locus generating method and a running locus generating apparatus.

BACKGROUND ART

Methods of generating a running locus of a vehicle have conventionally been employed, for example, in apparatus for providing a driver with an expected running locus through a display or the like (see, for example, Patent Literature 1). The apparatus of Patent Literature 1 is one which derives a running locus according to the road shape and the running speed of the own vehicle and provides the driver with the derived running locus by projecting it onto a windshield or the like.
Patent Literature 1: Japanese Patent Application Laid-Open No. 2005-228139

DISCLOSURE OF INVENTION

Technical Problem

The conventional running locus generating apparatus derives a running locus according to the road shape and the running speed of the own vehicle and thus can derive a running locus for reaching a destination or passing therethrough at the fastest speed, but is hard to derive a running locus taking other demands at the same time, e.g., a running locus taking account of a mileage demanded by the driver together with a passing time.

For solving such a technical problem, it is an object of the present invention to provide a running locus generating method and running locus generating apparatus which can derive a running locus satisfying the passing time and other driving conditions demanded by the driver.

Solution to Problem

The running locus generating method in accordance with the present invention comprises a first convergent computation step of deriving a running locus by a convergent computation such as to achieve a first constraint condition based on a predetermined target passing time and a road boundary, and a running locus deriving step of deriving a running locus by a convergent computation of an evaluation function for preferring a predetermined driving condition in a state achieving the first constraint condition.

This invention derives a running locus by a convergent computation such as to achieve a first constraint condition based on a predetermined target passing time and a road boundary, and derives a running locus by a convergent computation of an evaluation function for preferring a predetermined driving condition in a state achieving the first constraint condition. This can derive a running locus which, while satisfying the target passing time, can most favorably satisfy the predetermined driving condition determined by the evaluation function within a range satisfying the target passing time condition. Hence, a running locus satisfying the passing time and other driving conditions demanded by the driver can be derived.

For deriving a running locus satisfying a target passing time and other driving conditions, a running locus yielding the fastest speed and a running locus most favorably satisfying the other driving conditions may be derived and combined together while being weighted as demanded by the driver, so as to yield a running locus. Thus derived running locus takes account of the other driving conditions demanded by the driver to some extent but tends to become a geometric compromise and may fail to become a running locus fully reflecting the set weighting. Therefore, the present invention employs the target passing time as one of constraint conditions and carries out optimization while using a driving condition as an evaluation function. This can generate an ideal running locus instead of the geometric compromise.

Preferably, as the evaluation function, the running locus deriving step in the running locus generating method uses an evaluation function for preferring high mileage running; such a structure can derive a running locus reflecting the passing time and mileage demanded by the driver.

Preferably, when designating the mileage as the driving condition, the method further comprises a second convergent computation step of deriving a running locus by a convergent computation such as to achieve a second constraint condition based on the road boundary, a fastest running locus deriving step of deriving a fastest running locus by a convergent computation of an evaluation function for preferring a passing time of a predetermined segment in a state achieving the second constraint condition, a high mileage running locus deriving step of deriving a high mileage running locus by a convergent computation of an evaluation function for preferring high mileage running in a state achieving the second constraint condition, and a target passing time calculation step of calculating a target passing time by weighting a fastest passing time determined from the fastest running locus and a high mileage passing time determined from the high mileage running locus, while the first convergent computation step employs the target passing time calculated by the target passing time calculation step as the predetermined target passing time.

Such a structure can calculate the target passing time by computing respective passing times (fastest passing time and high mileage passing time) according to the fastest running locus and high mileage running locus and weighting thus computed both passing times as demanded by the driver. Therefore, deriving the running locus according to the calculated target passing time can more accurately reflect the conditions demanded by the driver.

The running locus generating apparatus in accordance with the present invention comprises a first convergent computation section for deriving a running locus by a convergent computation such as to achieve a first constraint condition based on a predetermined target passing time and a road boundary, and a running locus deriving section for deriving a running locus by a convergent computation of an evaluation function for preferring a predetermined driving condition in a state achieving the first constraint condition.

Preferably, as the evaluation function, the running locus deriving section in the running locus generating apparatus uses an evaluation function for preferring high mileage running.

Preferably, when designating the mileage as the driving condition, the apparatus further comprises a second convergent computation section for deriving a running locus by a convergent computation such as to achieve a second constraint condition based on the road boundary, a fastest running locus deriving section for deriving a fastest running locus by a convergent computation of an evaluation function for preferring a passing time of a predetermined segment in a state achieving the second constraint condition, a high mileage running locus deriving section for deriving a high mileage running locus by a convergent computation of an evaluation function for preferring high mileage running in a state achieving the second constraint condition, and a target passing time calculation section for calculating a target passing time by weighting a fastest passing time determined from the fastest running locus and a high mileage passing time determined from the high mileage running locus, while the first convergent computation section employs the target passing time calculated by the target passing time calculation section as the predetermined target passing time.

These running locus generating apparatus yield operations and effects similar to those of the running locus generating methods mentioned above.

Advantageous Effects of Invention

The present invention can derive a running locus satisfying the passing time and other driving condition demanded by the driver.

REFERENCE SIGNS LIST 1 running locus generating apparatus
2 ECU
21 second convergent computation section (second convergent computation step)
22 fastest running locus deriving section (fastest running locus deriving step)
23 high mileage running locus deriving section (high mileage running locus deriving step)
24 target passing time calculation section (target passing time calculation step)
25 first convergent computation section (first convergent computation step)
26 running locus deriving section (running locus deriving step)

DESCRIPTION OF EMBODIMENTS

In the following, an embodiment of the present invention will be explained with reference to the accompanying drawings. In the drawings, the same or equivalent parts will be referred to with the same signs while omitting their overlapping descriptions.

The running locus generating apparatus in accordance with this embodiment is an apparatus for generating a running locus of a vehicle and favorably employed in a vehicle equipped with an automatic driving function such as follow-up driving or lane-keeping driving or a vehicle mounted with a driver assistance system for improving running safety.

Figure 1:
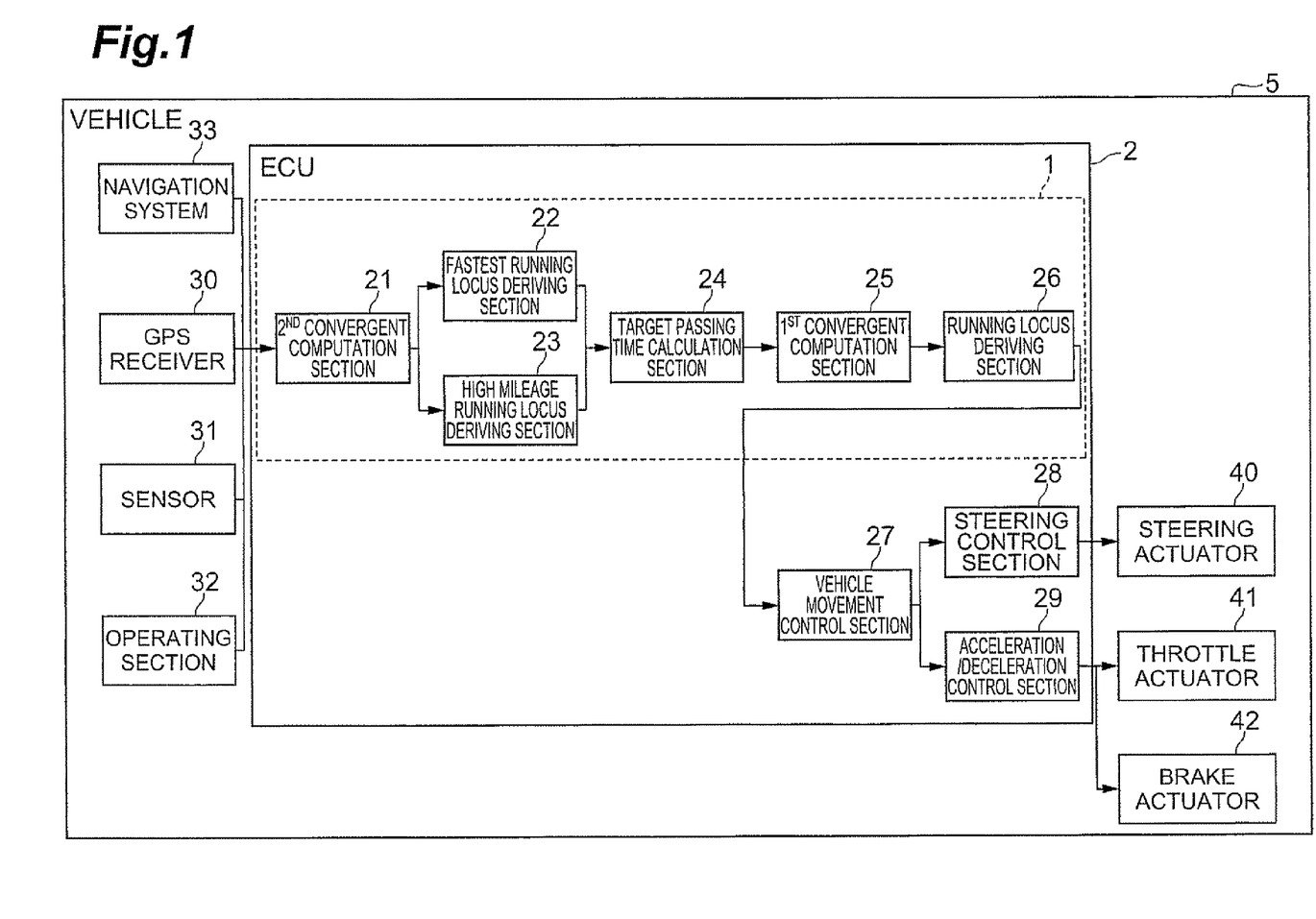
FIG. 1 is a block diagram illustrating an outline of the structure of a vehicle equipped with the running locus generating apparatus in accordance with a first embodiment.

First, the structure of the running locus generating apparatus in accordance with this embodiment will be explained. FIG. 1 is a block diagram illustrating the structure of a vehicle equipped with the running locus generating apparatus in accordance with the embodiment of the present invention.

The vehicle 5 illustrated in FIG. 1 is a vehicle equipped with an automatic driving function and comprises a GPS receiver 30, a sensor 31, an operating section 32, a navigation system 33, an ECU 2, a steering actuator 40, a throttle actuator 41, and a brake actuator 42. Here, the ECU (Electronic Control Unit) is a computer for an automotive device to be controlled electronically and comprises a CPU (Central Processing Unit), a ROM (Read Only Memory), a RAM (Random Access Memory), I/O interfaces, and the like.

The GPS receiver 30 has a function of receiving positional information of a driver, for example. Here, the GPS (Global Positioning System) refers to a measurement system using satellites and is favorably used for grasping the current position of the own vehicle. The GPS receiver 30 also has a function of outputting the positional information to the ECU 2.

The sensor 31 has a function of acquiring running environments about the vehicle 5 and running conditions of the own vehicle. For example, a lane recognizing sensor or image sensor for recognizing a lane of a road where the vehicle 5 runs, an electromagnetic-wave sensor or millimeter-wave sensor for detecting obstacles in front of the vehicle 5, a yaw rate sensor for measuring the yaw rate of the vehicle 5, a wheel speed sensor for measuring the wheel speed of the vehicle, and the like are used as the sensor 31. The sensor 31 also has a function of outputting the acquired information to the ECU 2.

The operating section 32 has a function of inputting conditions demanded by the driver. For example, an operating panel for inputting target passing times, target mileages, and the like is used as the operating section 32. The operating section 32 also has a function of outputting the inputted information to the ECU 2.

The navigation system 33 mainly has a function of guiding a route to a destination and so forth. The navigation system 33 also has a function of reading shape information of a road where the vehicle is currently running from a map database, for example, and outputting the road shape information as a navigation signal to the ECU 2. The vehicle 5 may be equipped with a database storing at least road shape information instead of the navigation system and have a function of outputting the road shape information stored in the database to the ECU 2. It may also have a function of referring to road shape information through communications and outputting the referred road shape information to the ECU 2.

The ECU 2 comprises a running locus generating apparatus 1, a vehicle movement control section 27, a steering control section 28, and an acceleration/deceleration control section 29.

The running locus generating apparatus 1 has a function of generating an optimized running locus of the vehicle 5. As an example of optimizing techniques executed by the running locus generating apparatus 1, this embodiment explains one using SCGRA (Sequential Conjugate Gradient Restoration Algorithm). The SCGRA is an optimizing technique which performs a convergent computation according to the steepest descent method until a constraint condition is satisfied, and a convergent computation according to the conjugate gradient method until an evaluation value of an evaluation function becomes the smallest, thereby generating a running locus. The constraint condition is an essential condition which must be satisfied by the running locus, while the evaluation function is a function for evaluating a condition to be focused on in the running.

A running locus generated by the running locus generating apparatus 1 is constituted by a number of parameters, such as position, speed pattern, acceleration pattern, yaw angle, and yaw rate, which are necessary for the vehicle to run. As an example of techniques for generating such a running locus, this embodiment explains one generating a running locus in each block by units of meshes which are segments dividing a running path.

The running locus generating apparatus 1 comprises a second convergent computation section 21, a fastest running locus deriving section 22, a high mileage running locus deriving section 23, a target passing time calculation section 24, a first convergent computation section 25, and a running locus deriving section 26.

The second convergent computation section 21 has a function of inputting road environment information such as road boundaries from the navigation system 33 and setting a second constraint condition according to the inputted information. The second constraint condition is set according to demands in terms of traffic such as running on roads and demands resulting from vehicle performances such as friction circle, acceleration/deceleration limits, and steering limits, for example. The second convergent computation section 21 also has a function of performing a convergent computation until the set second constraint condition is satisfied by using the steepest descent method, for example, so as to generate a running locus satisfying the second constraint condition. The second convergent computation section 21 further has a function of storing thus generated running locus satisfying the second constraint condition as a second constraint condition achieving state and outputting the second constraint condition achieving state to the fastest running locus deriving section 22 and high mileage running locus deriving section 23.

Figure 3:
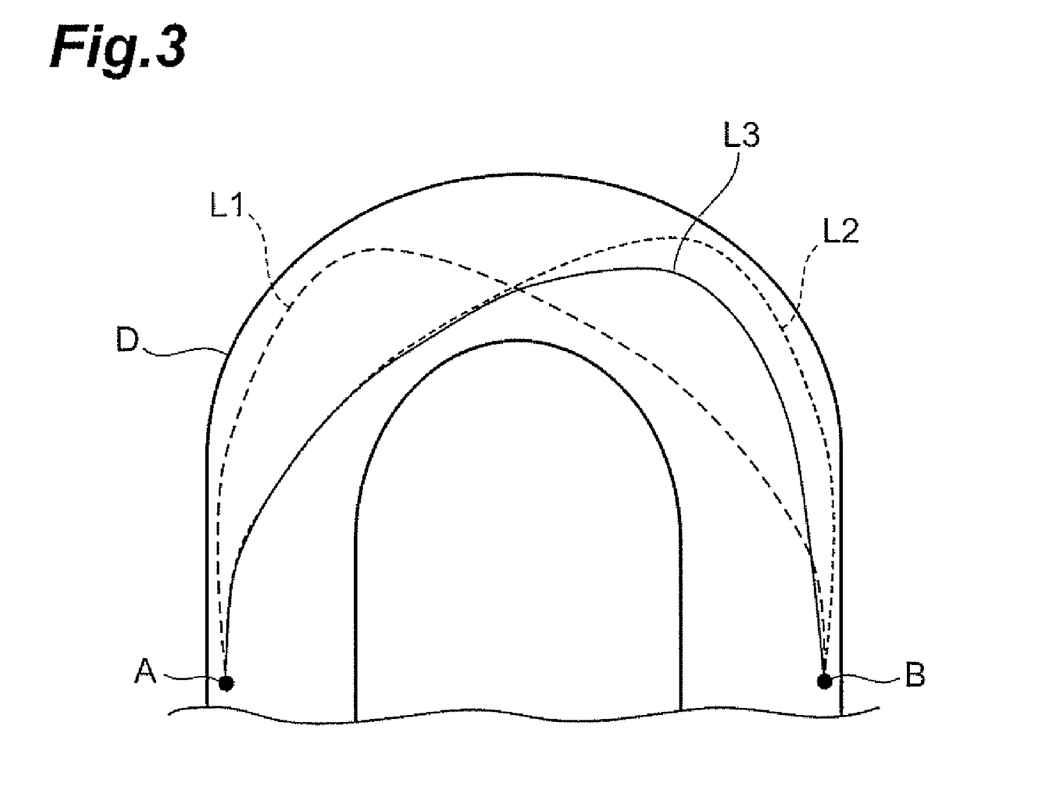
FIG. 3 is a schematic view explaining operations of the running locus generating apparatus in FIG. 1.

The fastest running locus deriving section 22 has a function of inputting the second constraint condition and second constraint condition achieving state from the second convergent computation section 21 and deriving a running locus (fastest running locus) passing a predetermined block (e.g., a segment from the start point A to target point B illustrated in FIG. 3) in the shortest time by using the second constraint condition achieving state as an initial value in a state achieving the inputted second constraint condition. Specifically, it is a function of carrying out a convergent computation according to the conjugate gradient method, for example, while using the block passing time as an evaluation function, so as to generate the fastest running locus. The fastest running locus deriving section 22 also has a function of outputting the calculated fastest running locus to the target passing time calculation section 24.

The high mileage running locus deriving section 23 has a function of inputting the second constraint condition and second constraint condition achieving state from the second convergent computation section 21 and deriving a running locus (high mileage running locus) passing the predetermined block with the highest mileage by using the second constraint condition achieving state as an initial value in a state achieving the inputted second constraint condition. Specifically, it is a function of carrying out a convergent computation according to the conjugate gradient method, for example, while using the block mileage as an evaluation function, so as to generate the high mileage running locus. The high mileage running locus deriving section 23 also has a function of outputting the calculated high mileage running locus to the target passing time calculation section 24.

The target passing time calculation section 24 has a function of inputting the fastest running locus and high mileage running locus from the fastest running locus deriving section 22 and high mileage running locus deriving section 23, respectively, and calculating the passing time (fastest passing time) of the block in the case of running on the fastest running locus and the passing time (high mileage passing time) of the block in the case of running on the high mileage running locus. It also has a function of combining the fastest passing time and high mileage passing time together while weighting them according to the target passing time, target mileage, and the like inputted through the operating section 32, so as to calculate a target passing time of the block. The target passing time calculation section 24 has a function of outputting the calculated target passing time to the first convergent computation section 25.

The first convergent computation section 25 has a function of inputting road environment information such as road boundaries from the navigation system 33 and setting a first constraint condition according to the target passing time inputted from the target passing time calculation section 24. The first constraint condition is similar to the second constraint condition in that it is an essential condition which is a prerequisite for generating a running locus but differs therefrom in that it includes a condition of the target passing time.

The first convergent computation section 25 also has a function of performing a convergent computation until the set first constraint condition is satisfied by using the steepest descent method, for example, so as to generate a running locus satisfying the first constraint condition. The first convergent computation section 25 calculates the running locus by computing per mesh unit as with the second convergent computation section 21. The first convergent computation section 25 further has a function of storing thus generated running locus satisfying the first constraint condition as a first constraint condition achieving state and outputting the first constraint condition achieving state to the running locus deriving section 26.

The running locus deriving section 26 has a function of deriving a running locus satisfying a predetermined driving condition while using the first constraint condition achieving state as an initial value in a state achieving the inputted first constraint condition. The predetermined driving condition is a condition other than the driving time, examples of which include the mileage demanded by the driver and conditions indicating the safety and comfortableness in running required by the driver. The running locus deriving section 26 also has a function of outputting the derived running locus to the vehicle movement control section 27.

The vehicle movement control section 27 has a function of calculating steering control information and acceleration/deceleration control information according to the running locus inputted from the running locus deriving section 26 and the surrounding running environment and running state of the own vehicle from the sensor 31. The vehicle movement control section 27 also has a function of outputting the calculated steering control information and acceleration/deceleration control information to the steering control section 28 and acceleration/deceleration control section 29, respectively.

The steering control section 28 has a function of generating a signal for controlling the steering actuator 40 according to the steering control information inputted from the vehicle movement control section 27 and outputting the generated control signal to the steering actuator 40. The steering actuator 40 is a mechanical constituent for controlling the running of the vehicle, an example of which is a steering angle control motor.

The acceleration/deceleration control section 29 has a function of generating a signal for controlling the throttle actuator 41 and brake actuator 42 according to the acceleration/deceleration control information inputted from the vehicle movement control section 27 and outputting the generated control signal to the throttle actuator 41 and brake actuator 42. The throttle actuator 41 is a mechanical constituent for controlling the running of the vehicle, an example of which is an electronic throttle. In the case of a hydraulic brake, for example, the brake actuator 42 has a function of adjusting the brake hydraulic pressure of each wheel.

Figure 2:
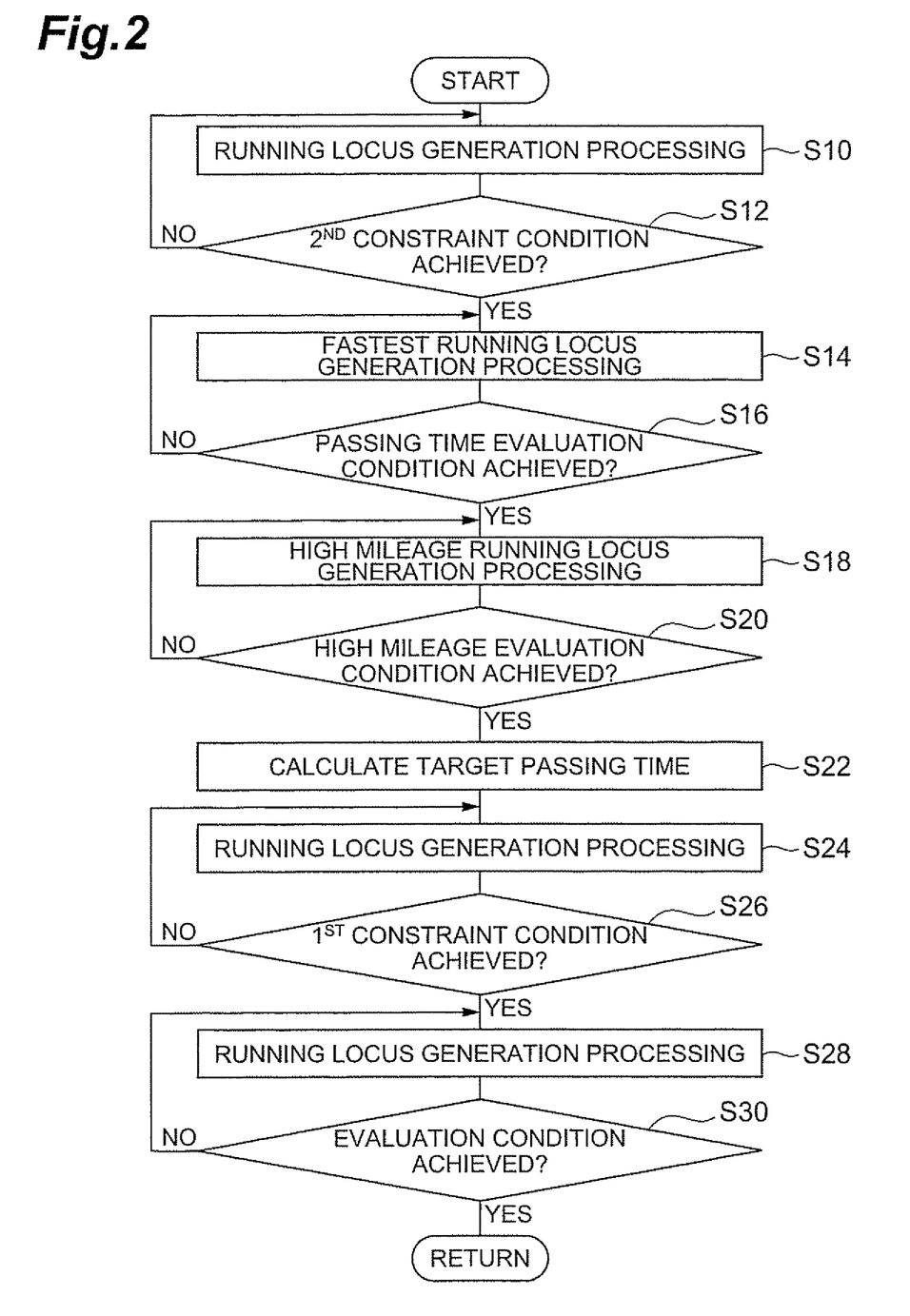
FIG. 2 is a flowchart illustrating operations of the running locus generating apparatus in FIG. 1.

Operations of the running locus generating apparatus 1 in accordance with this embodiment will now be explained. FIG. 2 is a flowchart illustrating operations of the running locus generating apparatus 1 in accordance with this embodiment. FIG. 3 is a schematic view for explaining operations of the running locus generating apparatus 1 in accordance with this embodiment and schematically illustrates running loci. The following will explain the vehicle 5 mounted with the running locus generating apparatus 1 as an HV (Hybrid Vehicle).

The control processing illustrated in FIG. 2 is executed repeatedly at predetermined timings after the ignition is turned on.

When the control processing illustrated in FIG. 2 begins, the running locus generating apparatus 1 starts with running locus generation processing (S10). The processing of S10, which is executed by the second convergent computation section 21, is one for calculating a block running locus such as to satisfy a constraint condition. To begin with, the second convergent computation section 21 sets a second constraint condition which is a constraint condition based on road boundaries and vehicle performance limits. For example, by inputting road environment information including road boundaries from the navigation system 33, the second convergent computation section 21 sets the second constraint condition. When generating a locus running from the start point A to target point B (through a block) as illustrated in FIG. 3, for example, the second convergent computation section 21 sets the second constraint condition by inputting the width, gradient, curve radius, and the like of a road D connecting the start point A and the target point B to each other. This sets the most basic constraint condition that the vehicle must run on the road D in the block. Next, using the previously determined running locus (the initial locus in the case of the initial convergent computation), the second convergent computation section 21 generates a running locus at this time such as to satisfy the second constraint condition. Specifically, a parameter constituting the previously determined running locus (the initial locus in the case of the initial convergent computation) is modified according to a correction formula used in the steepest descent method, for example, so as to generate a running locus close to one satisfying the second constraint condition. After the processing of S10 ends, the flow shifts to second constraint condition determination processing (S12).

The processing of S12, which is executed by the second convergent computation section 21, is one for determining whether or not the running locus generated by the processing of S10 satisfies the second constraint condition. When it is determined by the processing of S12 that the calculated running locus fails to satisfy the second constraint condition, the flow returns to the running locus generation processing (S10). As a consequence, the second convergent computation section 21 repeats the convergent computation illustrated in S10 and the determination illustrated in S12 (convergent computation) until a running locus satisfying the second constraint condition can be generated, so as to yield the running locus satisfying the second constraint condition (second convergent computation step). The processing of S10 and S12 is carried out for each of meshes dividing the block at a predetermined length, for example.

When it is determined by the processing of S12 that the generated running locus satisfies the second constraint condition, the flow shifts to fastest running locus generation processing (S14). The processing of S14, which is executed by the fastest running locus deriving section 22, is one for setting an evaluation function concerning the passing time and deriving a fastest running locus. The fastest running locus deriving section 22 inputs the second constraint condition from the second convergent computation section 21 and changes a parameter of the previously determined running locus (the running locus satisfying the second convergent condition calculated at S10 in the initial convergent computation) according to a correction formula used in the conjugate gradient method, for example, in a state achieving the inputted second constraint condition, such that an evaluation value concerning the passing time of the previously determined running locus becomes smaller, so as to generate the running locus at this time. For example, assuming that the block is divided into n (where n is a natural number) meshes, and $t_n$ is the time required for running through the nth mesh from the start point A, an evaluation function J1 determining the evaluation value concerning the passing time is represented by the following expression:

[Math. 1]

$$J1 = \Sigma t_n \qquad (1)$$

After the processing of S14 ends, the flow shifts to fastest evaluation condition determination processing (S16).

The processing of S16, which is executed by the fastest running locus deriving section 22, is one for determining whether or not an evaluation condition is satisfied by using the running locus generated by the processing of S14. Specifically, using the running locus generated by the processing of S14, the fastest running locus deriving section 22 calculates an evaluation value from the evaluation function J1 and determines that the evaluation condition is satisfied when the calculated evaluation value is the smallest. When the change in evaluation value calculated until the processing at this time, i.e., derivative value of the evaluation value, is 0 or substantially 0, it is determined that the evaluation value is the smallest. When it is determined by the processing of S16 that the running locus generated by the processing of S14 fails to satisfy the evaluation condition, the flow returns to the fastest running locus generation processing (S14). As a consequence, the fastest running locus deriving section 22 repeats the convergent computation illustrated in S14 and the determination illustrated in S16 (convergent computation) until a running locus satisfying the evaluation condition concerning the running time can be generated, so as to yield the fastest running locus (fastest running locus deriving step). By the processing of S14 and S16 mentioned above, the fastest running locus deriving section 22 derives an out-in-out fastest running locus L1 illustrated in FIG. 3, for example.

When it is determined by the processing of S16 that the running locus generated by the processing of S14 satisfies the fastest evaluation condition, the flow shifts to high mileage running locus generation processing (S18). The processing of S18, which is executed by the high mileage running locus deriving section 23, is one for setting an evaluation function concerning the high mileage and deriving a high mileage running locus. The high mileage running locus deriving section 23 inputs the second constraint condition from the second convergent computation section 21 and changes a parameter of the previously determined running locus (the running locus satisfying the second convergent condition calculated at S10 in the initial convergent computation) according to a correction formula used in the conjugate gradient method, for example, in a state achieving the inputted second constraint condition, such that an evaluation value concerning the high mileage of the previously determined running locus becomes smaller, so as to generate the running locus at this time. An evaluation function J2 determining the evaluation value concerning the high mileage is constructed such as to include the hydraulic brake heat dissipating amount released until the vehicle passes a predetermined mesh and the amount of energy loss caused at the time of regeneration and reoutput until the vehicle passes the mesh. For example, assuming that the block is divided into n (where n is a natural number) meshes as in the processing of S14, $t_n$ is the time required for running through the nth mesh from the start point A, $v_1$ and $v_2$ are respective vehicle speeds through the front and rear ((n−1)th and nth) meshes, m is the weight of the vehicle 5, $G_1$ is the hydraulic decelerating acceleration, $G_2$ is the decelerating acceleration, $G_3$ is the regenerative acceleration, and the ratio of energy loss due to regeneration is 20%, the evaluation function J2 determining the evaluation value concerning the high mileage is represented by the following expression:

[Math. 2]

$$J2 = \sum \left( 0.01 \cdot t_n + 0.99 \cdot \left( \begin{array}{c} m \cdot (v_1^2 - v_2^2) \cdot \frac{G_1}{G_2} + \\ 0.2 \cdot m \cdot (v_1^2 - v_2^2) \cdot \frac{G_3}{G_2} \end{array} \right) \right) \quad (2)$$

In expression (2), the regenerative acceleration $G_3$ determines the upper limit (e.g., 0.2 G) depending on the hybrid system. The decelerating acceleration $G_2$ is calculated from the derivative value of the vehicle speed between the front and rear meshes. For evading failures of calculation processing such as infinite loops, a condition concerning the passing time is added to expression (2) to such an extent (1% here) that the total evaluation is not affected. This can prevent unpractical solutions such as running (stopping) at 0 km/h as an optimal running locus, for example, from being derived. The hydraulic decelerating acceleration $G_1$, decelerating acceleration $G_2$, and regenerative acceleration $G_3$ are set such as to satisfy the following relationship:

[Math. 3]

$$G_2 + G_3 G_3 \quad (3)$$

Here, when the decelerating acceleration $G_2$ does not exceed the upper limit of the regenerative acceleration $G_3$, the hydraulic decelerating acceleration $G_1$ becomes 0. Using the previously determined running locus (the running locus satisfying the second constraint condition calculated by S10 in the initial convergent computation), the high mileage running locus deriving section 23 computes the running locus at this time. In expression (2), the condition concerning the passing time may be added as necessary in individual running locus generating apparatus by taking account of performances and the like required for the individual vehicles 5. After the processing of S18 ends, the flow shifts to high mileage evaluation condition determination processing (S20).

The processing of S20, which is executed by the high mileage running locus deriving section 23, is one for determining whether or not the running locus generated by the processing of S18 satisfies an evaluation condition preferring the high mileage running. Specifically, the high mileage running locus deriving section 23 calculates an evaluation value from the evaluation function J2 by using the running locus generated by the processing of S18 and determines that the evaluation condition is satisfied when the calculated evaluation value is the smallest. When the change in evaluation value calculated until the processing at this time, i.e., derivative value of the evaluation value, is 0 or substantially 0, it is determined that the evaluation value is the smallest. When it is determined by the processing of S20 that the evaluation condition is not satisfied, the flow returns to the high mileage running locus generation processing (S18). As a consequence, the high mileage running locus deriving section 23 repeats the convergent computation illustrated in S18 and the determination illustrated in S20 (convergent computation) until a running locus satisfying the evaluation condition preferring the high mileage running can be generated, so as to yield a running locus preferring the high mileage running (high mileage running locus deriving step). By the processing of S18 and S20 mentioned above, the high mileage running locus deriving section 23 derives a high mileage running locus L2 illustrated in FIG. 3, for example.

When it is determined by the processing of S20 that the running locus generated by the processing of S18 satisfies the high mileage evaluation condition, the flow shifts to target passing time calculation processing (S22). The processing of S22, which is executed by the target passing time calculation section 24, is one for calculating a target passing time for passing the block. First, the target passing time calculation section 24 calculates a fastest running time $t_U$ in the case of running on the fastest running locus according to the fastest running locus generated by the processing of S14 and S16 and a high mileage passing time $t_p$ in the case of running on the high mileage running locus according to the high mileage running locus generated by the processing of S18 and S20. Next, using the calculated fastest running time $t_U$ and high mileage passing time $t_p$, the target passing time calculation section 24 calculates a target passing time $t_s$. Since the speed and mileage are two contradictory items, the degree of preference for mileage can be represented by (1−k), where k is the degree of preference for the fastest speed. As a consequence, the target passing time $t_s$ is represented by the following expression:

[Math. 4]

$$t_s = k \cdot t_U + (1-k) \cdot t_p \quad (4)$$

By using expression (4), the target passing time calculation section 24 calculates a target running time (target passing time calculation step). The fastest speed preference degree k used in expression (4) may be set according to a value inputted by the driver from the operating section 32. After the processing of S22 ends, the flow shifts to first constraint condition setting processing (S24).

The processing of S24, which is executed by the first convergent computation section 25, is one for calculating a block running locus such as to satisfy a constraint condition. To begin with, the first convergent computation section 25 sets a first constraint condition which is a constraint condition based on road boundaries, vehicle performance limits, and a target running time. For example, the first convergent computation section 25 sets the first constraint condition by inputting road environment information including road boundaries from the navigation system 33 and using the target passing time $t_s$ generated by the processing of S22. A specific example of inputting road boundaries is the same as the processing of S10. Hence, the first constraint condition includes the most basic constraint condition that the vehicle must run on the road D in the block and a constraint condition that the vehicle must run within the target passing time $t_s$. Next, using the previously determined running locus (the initial running locus in the case of the initial convergent computation), the first convergent computation section 25 generates a running locus at this time such as to satisfy the first constraint condition. Specifically, a parameter constituting the previously determined running locus (the initial locus in the case of the initial convergent computation) is changed according to a correction formula used in the steepest descent method, for example, so as to generate a running locus close to one satisfying the first constraint condition. After the processing of S24 ends, the flow shifts to first constraint condition determination processing (S26).

The processing of S26, which is executed by the first convergent computation section 25, is one for determining whether or not the running locus generated by the processing of S24 satisfies the first constraint condition. When it is determined by the processing of S26 that the calculated running locus fails to satisfy the first constraint condition, the flow returns to the first constraint condition setting processing (S24). As a consequence, the first convergent computation section 25 repeats the convergent computation illustrated in S24 and the determination illustrated in S26 (convergent computation) until a running locus satisfying the first constraint condition can be generated, so as to yield the running locus satisfying the first constraint condition (first convergent computation step). The processing of S24 and S26 is carried out for each of meshes dividing the block by a predetermined length, for example.

When it is determined by the processing of S26 that the generated running locus satisfies the first constraint condition, the flow shifts to running locus generation processing (S28). The processing of S28, which is executed by the running locus deriving section 26, is one for setting an evaluation function concerning the high mileage and deriving a high mileage running locus. The running locus deriving section 26 inputs the first constraint condition from the first convergent computation section 25 and changes a parameter of the previously determined running locus (the running locus satisfying the first convergent condition calculated at S24 in the initial convergent computation) according to a correction formula used in the conjugate gradient method, for example, in a state achieving the inputted first constraint condition, such that an evaluation value concerning the high mileage of the previously determined running locus becomes smaller, so as to generate the running locus at this time. For example, assuming that the block is divided into n (where n is a natural number) meshes, $v_1$ and $v_2$ are respective vehicle speeds through the front and rear ((n−1)th and nth) meshes, m is the weight of the vehicle 5, $G_1$ is the hydraulic decelerating acceleration, $G_2$ is the decelerating acceleration, $G_3$ is the regenerative acceleration, and the ratio of energy loss due to regeneration is 20%, an evaluation function J3 determining the evaluation value concerning the high mileage is represented by the following expression:

[Math. 5]

$$J3 = \sum \left( \begin{array}{c} m \cdot (v_1^2 - v_2^2) \cdot \dfrac{G_1}{G_2} + \\ 0.2 \cdot m \cdot (v_1^2 - v_2^2) \cdot \dfrac{G_3}{G_2} \end{array} \right) \quad (5)$$

Since the passing time is employed as a constraint condition in the processing of S24 and S26, the evaluation function represented by expression (5) needs no term for the passing time. As in the processing of S18, the hydraulic decelerating acceleration $G_1$, decelerating acceleration $G_2$, and regenerative acceleration $G_3$ satisfy the relationship represented by expression (4), so that the hydraulic decelerating acceleration $G_1$ becomes 0 when the decelerating acceleration $G_2$ does not exceed the upper limit of the regenerative acceleration $G_3$.

When the processing of S28 ends, the flow shifts to high mileage evaluation condition determination processing (S30).

The processing of S30, which is executed by the running locus deriving section 26, is one for determining whether or not the running locus generated by the processing of S28 satisfies an evaluation condition preferring the high mileage running. Specifically, the running locus deriving section 26 calculates an evaluation value from the evaluation function J3 by using the running locus generated by the processing of S28 and determines that the evaluation condition is satisfied when the calculated evaluation value is the smallest. When the change in evaluation value calculated until the processing at this time, i.e., derivative value of the evaluation value, is 0 or substantially 0, it is determined that the evaluation value is the smallest. When it is determined by the processing of S30 that the evaluation condition is not satisfied, the flow returns to the high mileage running locus generation processing (S28). As a consequence, the running locus deriving section 26 repeats the convergent computation illustrated in S28 and the determination illustrated in S30 (convergent computation) until a running locus satisfying the evaluation condition preferring the high mileage running can be generated, so as to yield a running locus preferring the high mileage running (running locus deriving step). By the processing of S28 and S30 mentioned above, the running locus deriving section 26 derives an optimal running locus L3 illustrated in FIG. 3, for example. When it is determined by the processing of S30 that the running locus generated by the processing of S28 satisfies the high mileage evaluation condition, the control processing illustrated in FIG. 2 is terminated.

The foregoing completes the control processing of FIG. 2. As illustrated in FIG. 2, by including the passing time in the constraint condition, the running locus generating apparatus 1 makes it unnecessary to optimize the passing time with an evaluation function and thus can perform optimization by evaluating the mileage alone.

Figure 4:
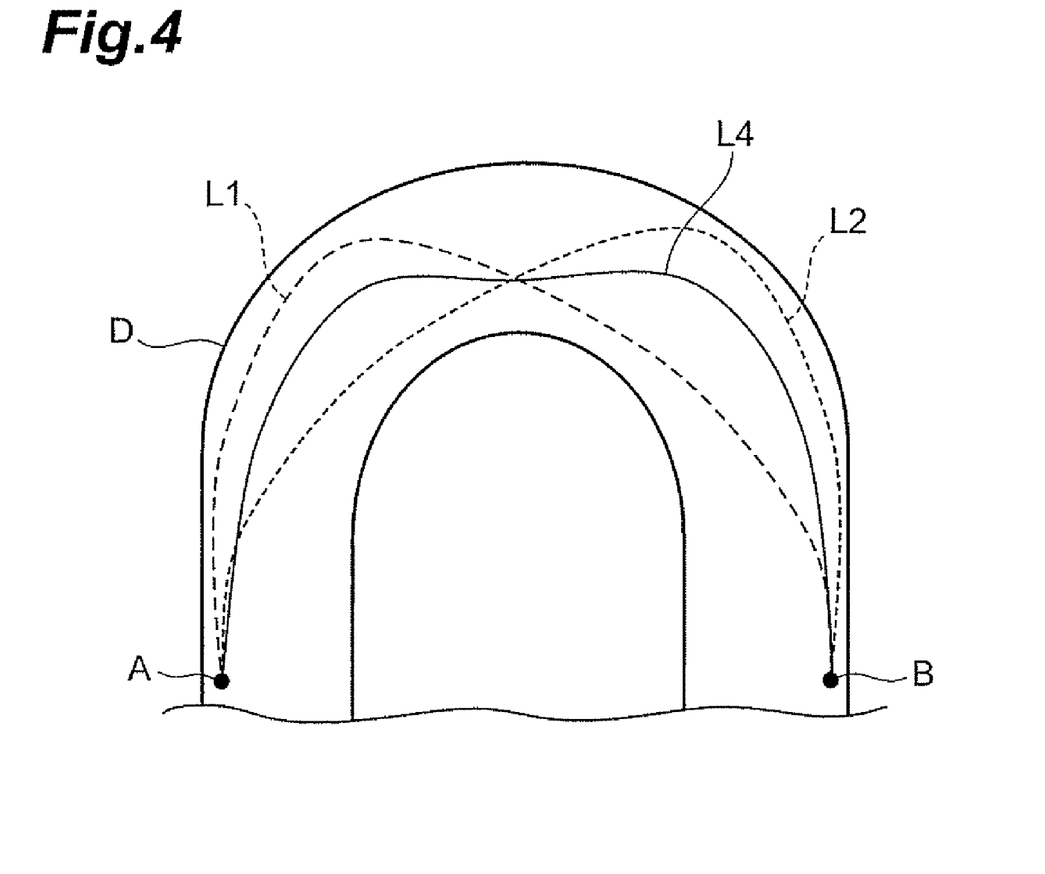
FIG. 4 is a schematic view for explaining operations of a conventional running locus generating apparatus.

Since it has conventionally been difficult to generate a running locus appropriately reflecting the passing time and mileage demanded by the driver, a running locus has been derived by combining the fastest running locus L1 and high mileage running locus L2 together while weighting them as demanded by the driver, for example. Such a case tends to yield a geometric compromise, such as the running locus L4 in FIG. 4, which is poor in practicality, and may fail to become a running locus fully reflecting the set weighting.

In contrast, the running locus generating method and running locus generating apparatus 1 in accordance with this embodiment derive a running locus by a convergent computation such as to achieve the first constraint condition set according to the target passing time $t_s$ and road boundaries and the like of the road D, and derive a running locus by a convergent computation of an evaluation function for preferring high mileage in a state achieving the first constraint condition, thus being able to produce a running locus which is excellent in mileage while making it essential to run within the target passing time. This can derive a practically unproblematic running locus which satisfies the passing time and high mileage condition demanded by the driver. According to thus optimized running locus L3, the vehicle movement control section 27 outputs vehicle control information to the steering control section 28 and acceleration/deceleration control section 29, so that the steering control section 28 and acceleration/deceleration control section 29 control the steering actuator 40, throttle actuator 41, and brake actuator 42, whereby the vehicle 5 can run with the optimized passing time and mileage.

The running locus generating method and running locus generating apparatus 1 in accordance with this embodiment can calculate the target passing time $t_s$ by computing the fastest passing time $t_U$ and high mileage passing time $t_p$ according to the fastest running locus L1 and high mileage running locus L2 and weighting thus computed passing times $t_U$ and high mileage passing time $t_p$ as demanded by the driver. As a consequence, deriving a running locus by using thus calculated target passing time $t_s$ can more accurately reflect the conditions demanded by the driver.

The above-mentioned embodiment illustrates an example of the running locus generating apparatus in accordance with the present invention. The running locus generating apparatus in accordance with the present invention is not limited to the one in accordance with the embodiment but may be any of its modifications and applications to others within the scope not changing the gist defined in each claim.

For instance, though the above-mentioned embodiment explains an example in which the target passing time for setting the first constraint condition is calculated by the target passing time calculation section 24, the target passing time inputted by the driver through the operating section 32 may be employed.

Though the above-mentioned embodiment explains a case where the vehicle 5 is an HV, the vehicle 5 may be a vehicle with no regenerating mechanism. In such a case, a high mileage running locus may be evaluated and calculated by using those excluding the terms of energy loss upon regeneration and reoutput in the evaluation functions J2 and J3 explained in the above-mentioned embodiment.

Though the above-mentioned embodiment explains a case where the vehicle 5 is one equipped with an automatic driving function, it is also applicable to a vehicle or system in which manual driving and automatic driving are in cooperation with each other.

Though the above-mentioned embodiment explains a case where a running locus preferring high mileage is derived while employing the passing time as a constraint condition, a running locus preferring ride comfort or a running locus preferring safety may be derived; matters to be preferred are not limitative as long as the passing time is employed as a constraint condition.

The invention claimed is:

1. A running locus generating method comprising:
deriving, by an electronic control unit, a running locus by a convergent computation according to an optimizing technique to achieve a first constraint condition based on a predetermined target passing time and a road boundary; and
deriving, by the electronic control unit, a running locus from derived running loci that run within a street boundary and pass within the predetermined target passing time for reaching a destination by a convergent computation of an evaluation function according to the optimizing technique that gives preference to a predetermined driving condition,
wherein the evaluation function evaluates predetermined driving conditions other than target passing time.

2. The running locus generating method according to claim 1, wherein, as the evaluation function, the running locus for reaching the destination by the convergent computation uses an evaluation function according to the optimizing technique that gives preference to high mileage running.

3. The running locus generating method according to claim 2, further comprising:
deriving, by the electronic control unit, a running locus by a convergent computation according to the optimizing technique to achieve a second constraint condition based on the road boundary;
deriving, the electronic control unit, a fastest running locus by a convergent computation of an evaluation function according to the optimizing technique that gives preference to a passing time of a predetermined segment in a state achieving the second constraint condition;
deriving, by the electronic control unit, a high mileage running locus by a convergent computation of an evaluation function according to the optimizing technique that gives preference to high mileage running in a state achieving the second constraint condition; and
calculating, by the electronic control unit, a target passing time by weighting a fastest passing time determined from the fastest running locus and a high mileage passing time determined from the high mileage running locus;
wherein the deriving of the running locus by the convergent computation according to the optimizing technique employs the target passing time calculated by the electronic control unit as the predetermined target passing time.

4. A running locus generating apparatus comprising:
a first convergent computation section for deriving a running locus by a convergent computation according to an optimizing technique to achieve a first constraint condition based on a predetermined target passing time and a road boundary; and
a running locus deriving section for deriving a running locus from derived running loci that run within a street boundary and pass within the predetermined target passing time for reaching a destination by a convergent computation of an evaluation function according to the optimizing technique that gives preference to a predetermined driving condition,
wherein the evaluation function evaluates predetermined driving conditions other than target passing time.

5. The running locus generating apparatus according to claim 4, wherein, as the evaluation function, the running locus deriving section uses an evaluation function according to the optimizing technique that gives preference to high mileage running.

6. The running locus generating apparatus according to claim 5, further comprising:
a second convergent computation section for deriving a running locus by a convergent computation according to the optimizing technique to achieve a second constraint condition based on the road boundary;
a fastest running locus deriving section for deriving a fastest running locus by a convergent computation of an evaluation function according to the optimizing technique that gives preference to a passing time of a predetermined segment in a state achieving the second constraint condition;
a high mileage running locus deriving section for deriving a high mileage running locus by a convergent computation of an evaluation function according to the optimizing technique that gives preference to high mileage running in a state achieving the second constraint condition; and a target passing time calculation section for calculating a target passing time by weighting a fastest passing time determined from the fastest running locus and a high mileage passing time determined from the high mileage running locus;

wherein the first convergent computation section employs the target passing time calculated by the target passing time calculation section as the predetermined target passing time.

* * * * *